UNITED STATES PATENT OFFICE.

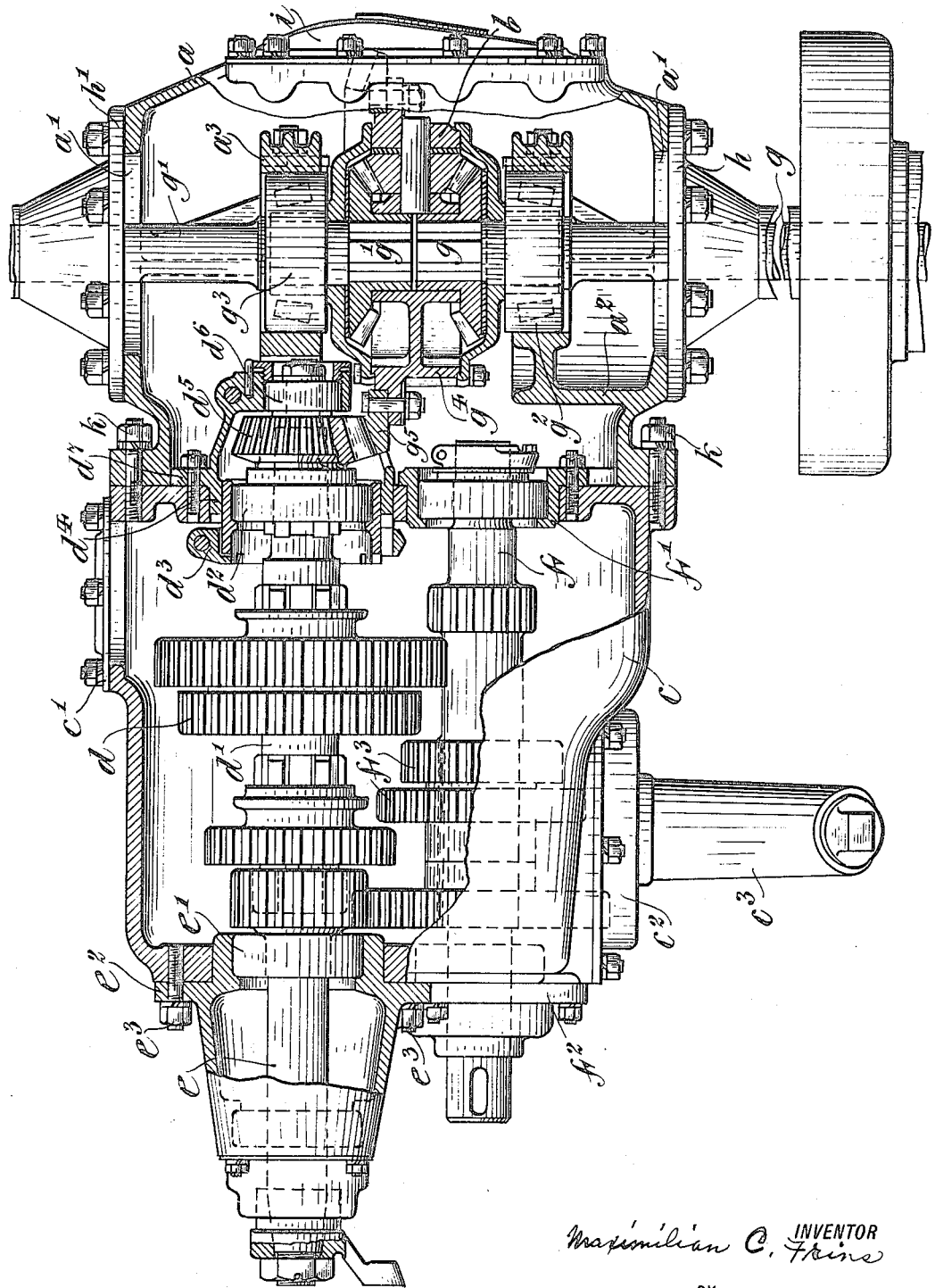

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

FINAL DRIVE FOR MOTOR-VEHICLES.

1,386,614.   Specification of Letters Patent.   Patented Aug. 9, 1921.

Application filed September 24, 1920. Serial No. 412,522.

*To all whom it may concern:*

Be it known that I, MAXIMILIAN C. FRINS, a citizen of the United States, residing in the borough of Manhattan of the city of New York, in the State of New York, have invented certain new and useful Improvements in Final Drives for Motor-Vehicles, of which the following is a specification, reference being had to the accompanying drawing, forming a part hereof.

This invention relates to a construction in motor vehicles wherein the selective speed transmission is placed in juxtaposition to the differential final drive and has for its object to improve such constructions so as to cheapen their manufacture and increase the facility for assembling and disassembling the various units, particularly so that all of the parts associated with the differential and axle sections can be assembled and disassembled independently of the parts associated with the transmission set. In realizing the objects of the invention, one of the principal features resides in making up separate housings for the differential and for the transmission set and bolting these housings together, the parts within the respective housings, however, being self-contained and independent of the parts in the other housing. A further feature resides in providing suitable openings in the respective housings so as to permit entry for inspection and repair. Still another object resides in the forming of a bearing retainer which is secured to one of the housings and is adapted to be engaged by the other housing in such manner as to aline the two housings properly when brought together without requiring the expensive and delicate grooving usually employed along the meeting edges of mechanical units. In carrying out this object of the invention the centering of the housings thus obtained is such as to insure the proper alining of the drive pinion with relation to the ring gear on the differential, a result which could not be accomplished by employing the usual centering grooves. These and other objects of the invention will appear with greater particularity in connection with the detailed description of the embodiment shown in the drawing, which is a plan view of the drive with most of the upper walls of the two housings broken away in the interest of clearness.

The invention is designed primarily with reference to a chain drive for motor trucks in which jack shafts are driven from the differential. Constructions have been proposed in which a change speed gear set is mounted within the same housing as the differential for a chain drive, but in such constructions this housing has been one piece thereby necessitating an expensive casting and expensive machining thereof and a relatively great loss by spoilage of the casting. In accordance with the present invention, this great objection to such a housing is eliminated by providing a housing $a$ for the differential $b$ and a separate gear casing $c$ for the selective speed transmission set indicated generally at $d$. The propeller shaft $e$ has its end bearing $e'$ journaled in a retainer $e^2$ which is formed with a hub to rest within an opening in the end wall of the case $c$, the retainer being bolted to the case as by bolts $e^3$. The counter shaft $f$ of the transmission set has retainers $f'$, $f^2$ at its opposite ends bolted in the end walls of the case $c$. The driven shaft $d'$ on which are splined the change speed gears $d$ has an end bearing $d^2$ supported in an adjusting ring $d^3$ which, in turn, rests within a retainer $d^4$ bolted within an opening in the end wall of the case $c$. At one side of the case $c$ is secured a removable plate $c'$ which covers a hand-hole to permit inspection of the case, while at the other side is secured a removable plate $c^2$ which may carry a filler tube $c^3$ and which may be removed from the hand-hole which it covers. The opening covered by the plate $c^2$ is of such size and relation to the gears on the counter shaft $f$ as to permit a supplemental power take-off attachment to be bolted in its place and meshed with the gears, such as $f^3$, on said counter shaft.

The description thus far given is of a selective speed transmission mounted within a case and embodying all of the usual features and yet improved in certain respects noted. This transmission set in the improved construction can be assembled as a unit in a manner which will be obvious and without reference to any other features now to be described.

The final drive at the differential includes jack shafts $g$, $g'$ which extend into the housing $a$ through openings $a'$ formed at opposite sides thereof and covered by removable plates $h$, $h'$, respectively, which are bolted in place after the differential is assembled.

The rear wall of the housing $a$ is provided with an opening adapted to be covered by a removable plate $i$, which may be readily removable for the assembling or disassembling of any of the parts within the housing. On the inner wall of the housing are cast webs $a^2$, $a^3$, of such form and disposition as to support the bearings $g^2$, $g^3$ for the differential housing $g^4$. To the housing $g^4$ is bolted a bevel ring gear $g^5$ adapted to mesh with the drive pinion $d^5$ on the drive shaft $d'$ of the transmission set.

The differential final drive described is in all other respects of standard construction and the units thereof can be assembled and disassembled within the housing $a$ with great facility and independently of any of the elements associated with the transmission set.

In bringing the gear set into juxtaposition with the final drive in accordance with the present improvements it is proposed to bolt the open ended casing $a$ to the proximate end wall of the gear case $c$, as by means of bolts $k$. In bolting two such parts together it will be understood that some centering device is essential and since it is necessary that the bevel gear $g^5$ shall always maintain its proper adjusted relation to the bevel pinion $d^5$, such a centering device should have some predetermined relation to such gears. If the meeting edges of the two casings were provided with tongues and grooves or were shouldered, as is the usual practice in centering mechanical units, it is evident that not only would the expense of machining be very great but the centering would be done with relation to the axes of the cases rather than with relation to the point of mesh of the gears $d^5$, $g^5$. Accordingly, improved centering devices are employed. The retainer $d^4$ which is bolted in the end wall of the case $c$ and which supports the bearing $d^2$ for the drive shaft $d'$ and also the outboard bearing $d^6$ for the bevel pinion $d^5$ is formed with a flange $d^7$ curved about the axis of the shaft $d'$. The edge of this flange $d^7$ is adapted to be engaged by the inner wall of the case $a$ when the latter is moved into position for bolting to the case $c$. The portion of the inner wall of the case $a$ which engages this flange $d^7$ is curved concentrically therewith about the axis of the shaft $d'$, so that the case $a$ is centered on the case $c$ with relation to the axis of the shaft $d'$. This centering is critical since it is necessary that it should bear a fixed relation with the mesh of the teeth of the gears $d^5$, $g^5$, and not a predetermined relation to the axes of the cases $a$ and $c$.

The entire construction described is simpler and cheaper than any heretofore known and facilitates the assembling and disassembling of the parts of the respective units, permitting the transmission set to be assembled entirely independent of the differential final drive so that one or the other of these units can be taken out bodily from its case without disturbing the other unit or the parts thereof. However, when the desired adjustment between the parts of the two units is once effected, the predetermined relation will be preserved even after removal of one unit or the other by the novel means employed for centering one case on the other.

What I claim is:

1. In motor vehicles, a differential housing, a gear case, a differential gear mounted entirely within its housing, a driven shaft within the gear case having sliding gears thereon and extending through the end wall to receive a driving pinion, means to secure the housing to the gear case and means coöperating with the housing and case to center them with respect to said shaft so that the drive pinion is brought into mesh with the differential gear upon assembling.

2. In automobile construction, a differential housing having webs cast on its inner wall, a differential gear supported in said webs, a gear case, a driven shaft mounted therein and extending through the end wall thereof, a retainer mounted in the end wall, a bearing for the driven shaft supported in said retainer, a driving pinon on the outer end of said driven shaft and bolts to secure the housing to the said end wall of the gear case with said driving pinion in mesh with the differential gear.

3. In automobile construction, a differential housing, a transmission case, a driven shaft therein extending through the end wall of the case, a driving pinion adjacent the outer end of the shaft for mesh with the differential gear, a retainer secured to the end wall of the case, a bearing for the driven shaft carried in said retainer, a flange on the retainer to engage the inner wall of the housing and center it on the case, and means to secure the housing to the said end wall of the case.

4. In automobile construction, a differential housing having webs cast on its inner wall, a differential gear supported in said webs and said housing being provided with a hand port, a removable plate to cover said port, a transmission case having change speed gears mounted therein and including a shaft extending through the end wall thereof, a retainer bolted to the end wall of the case, spaced bearings for the shaft carried by the retainer, a bevel pinion carried on the shaft between said bearings and adapted to mesh with the differential gear, a flange on the retainer curved about the axis of said shaft and adapted to be engaged by the inner wall of the housing when the housing is secured to the case to center the two.

5. In automobile construction, a differential housing, a gear case, a driven shaft extending through the end wall of the case, a bearing retainer mounted in the end wall of the case, a flange on the retainer curved about the axis of the shaft, a portion of the inner wall of said housing being curved concentrically with said shaft and adapted to engage said flange to center the housing when it is secured to the case.

This specification signed this 22d day of September A. D., 1920.

MAXIMILIAN C. FRINS.